United States Patent [19]

Ahrens et al.

[11] Patent Number: 5,394,075
[45] Date of Patent: Feb. 28, 1995

[54] SPACECRAFT BUS REGULATION USING SOLAR PANEL POSITION

[75] Inventors: Allan F. Ahrens, Sylmar; Harold A. Rosen, Santa Monica, both of Calif.

[73] Assignee: Hughes Aircraft Company, Los Angeles, Calif.

[21] Appl. No.: 987,901

[22] Filed: Dec. 4, 1992

[51] Int. Cl.6 ............................................... H02J 7/00
[52] U.S. Cl. ........................................ 320/39; 320/43; 323/906
[58] Field of Search ............... 320/2, 5, 14, 39, 40, 320/43, 44, 61; 307/64, 66; 323/906; 244/158 R, 159

[56] References Cited

U.S. PATENT DOCUMENTS

| | | | |
|---|---|---|---|
| 3,740,636 | 6/1973 | Hogrefe et al. | 320/2 |
| 3,781,647 | 12/1973 | Glaser | 322/2 R |
| 3,816,804 | 6/1974 | Cardwell, Jr. | 320/43 X |
| 4,494,063 | 1/1985 | Callen et al. | 320/39 X |
| 4,575,679 | 3/1986 | Chung et al. | 320/40 X |
| 4,661,758 | 4/1987 | Whittaker | 323/906 X |
| 4,691,159 | 9/1987 | Ahrens et al. | 323/906 X |
| 4,728,878 | 3/1988 | Anthony | 323/906 X |

Primary Examiner—Kristine L. Peckman
Attorney, Agent, or Firm—William J. Streeter; Wanda K. Denson-Low

[57] ABSTRACT

A spacecraft power bus regulation method and apparatus for a spacecraft. The spacecraft has solar arrays (10) and a battery (30) coupled to the spacecraft power bus (32) to drive electrical loads (34). A bus voltage limiter (38) controls the flow of current from the solar arrays while a bidirectional battery controller (36) controls power flow into and out of the battery. A processor (46) monitors current flow and battery condition using sensors (40, 42, 44, 48) and controls the bus voltage limiter accordingly. Auxiliary control is provided by the solar array drive (24) which controls the orientation of the solar arrays with respect to the sun.

23 Claims, 4 Drawing Sheets

SPACECRAFT BUS REGULATION USING SOLAR PANEL POSITION

FIELD OF THE INVENTION

The present invention pertains to the field of spacecraft power bus regulation, and in particular, to regulating the power on a spacecraft power bus using solar panel positioning.

BACKGROUND OF THE INVENTION

Many spacecraft and, in particular, geosynchronous communications satellites, use panels of solar cells to power the electrical equipment loads of the spacecraft. Such equipment typically include communications transponders, sensors, detectors and data processing equipment. Spacecraft typically include a battery for powering the loads when the spacecraft is out of view of the sun. Because of variations in the power consumption needs of the spacecraft, variations in the amount of power generated by the solar panels and variations in the battery condition, many spacecraft regulate the voltage and current on the spacecraft power bus which powers the electrical loads.

In one design, a battery is coupled to the spacecraft power bus through a battery charge controller and a battery discharge controller. The battery discharge controller feeds the spacecraft bus from the battery when the load is in excess of the solar panel capability. The charge controller feeds current to the battery when there is excess bus power available and the battery requires it. In other words, when there is a shortage of current on the bus, the battery is discharged and when there is a surplus of current on the bus, the battery is allowed to be recharged. Solar panels are coupled to the same bus through bus voltage limiters. The bus voltage limiters monitor the voltage of the bus and either open or close solar panel circuit connections to the bus, regulating the power supplied by the solar panels, to maintain the voltage and current on the bus in as stable a state as possible. The solar panels in such a spacecraft are designed with excess power generation capacity so that the battery charge condition can be maintained even when the other loads on the bus are heavy.

In an alternative design, it is also known to use a bidirectional battery controller to regulate the charge state of the battery. However, such a bidirectional battery controller puts additional demands on the bus voltage limiter to increase or reduce the power supply to the bus in response to the needs of the battery. The bus voltage limiter in both designs typically has a large number of circuits to control each and every circuit of the solar panel and it is a fairly heavy and complex device which adds significantly to the weight of the spacecraft. Weight significantly increases the cost of stationkeeping and of launching.

An alternative design eliminates the battery voltage limiter and the bidirectional battery controller or battery charge and discharge controllers. Instead, the power on the bus is regulated by changing the orientation of the solar panels with respect to the sun. Since a solar cell's output is a function of its angle to the sun, angling the panels controls the panels' power output. However, a typical solar panel drive requires several minutes to make any significant change in panel orientation, whereas bus loads can change in a matter of fractions of a second. Accordingly, in such a design, the voltage level on the bus varies widely and it is necessary to construct each power consuming device on the bus so that it can compensate for the wide variations in the power supply voltage. In many applications, the additional weight added to the power consuming devices compensates for any weight savings made by eliminating the battery bus voltage limiter and the battery controllers.

SUMMARY OF THE INVENTION

The present invention allows the weight of a spacecraft to be significantly reduced by using solar panel position to regulate the power on a spacecraft bus while still allowing quick and accurate responses to changes in spacecraft bus power demands. In one embodiment, the invention is an apparatus for controlling the power carried on a spacecraft bus comprising a battery for storing and providing power carried on the bus and a battery controller for regulating the flow of power on the bus into and out of the battery. A solar array has a plurality of solar cells for supplying power to the bus and a solar array drive moves the orientation of the solar array with respect to the sun. A battery condition sensor measures the battery condition and a processor in communication with the sensor, controls the operation of the solar array drive in response to the battery condition. Preferably, the invention also encompasses a bus voltage limiter for alternately connecting and disconnecting only some of the solar cell circuits to and from the spacecraft power bus. The small bus voltage limiter allows for fast changes in the amount of power supplied to the bus. These elements in combination allow precise and fast responses to changes in loads on the power bus without requiring the additional weight of the heavy bus voltage limiters used in prior designs.

BRIEF DESCRIPTION OF THE DRAWINGS

These and other aspects of the invention will be more fully understood by referring to the following detailed description and accompanying drawings wherein.

DETAILED DESCRIPTION OF THE INVENTION

Figure 1:
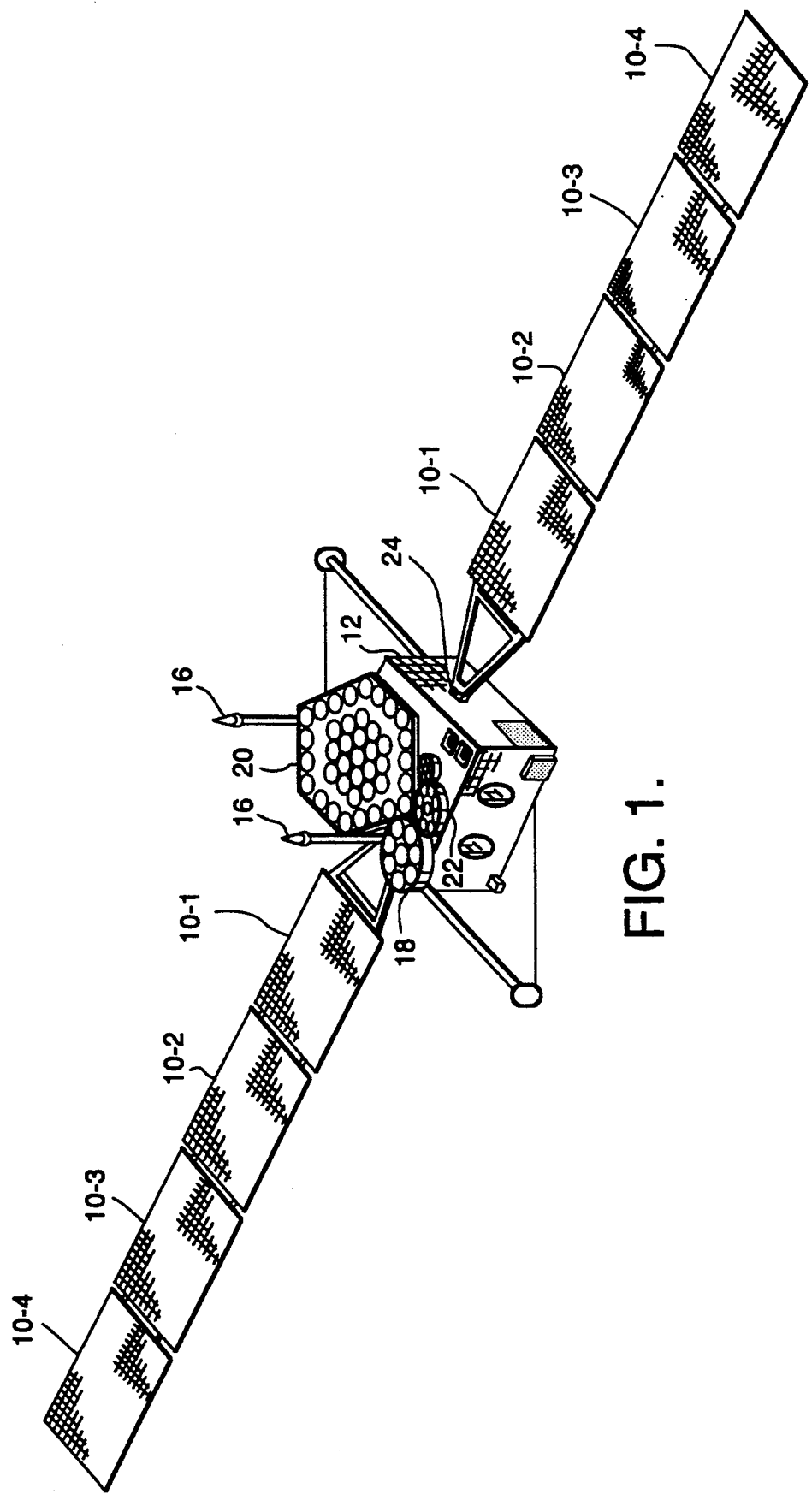
FIG. 1 is a diagram of a geosynchronous communications satellite.

FIG. 1 shows a spacecraft suitable for implementation of the present invention. The spacecraft is a geosynchronous communications satellite having two solar panel arrays 10 each one extending from opposite sides of a spacecraft main body 12. Each solar array has four panels 10-1, 10-2, 10-3, 10-4, which collectively power all of the power consuming devices on the spacecraft. These include a variety of antennas 16, 18, 20, 22 and the modulators, demodulators, amplifiers and other equipment related to the antennas (not shown). In addition to the communications equipment, the satellite may also carry sensing and detecting equipment (not shown) and attitude control systems, including sensors, gyros, momentum wheels, thrusters and on board satellite attitude control circuitry for controlling the momentum wheels and thrusters. In addition, the satellite includes a pair of electric solar array drives 24 each coupled directly to a solar array. The solar array drives rotate the solar arrays with respect to the spacecraft's main body so that the solar arrays can be directed toward the sun for maximum efficiency as the spacecraft rotates about the Earth. While the invention will be described in the context of a geosynchronous Earth orbiting communications satellite, the present invention may also be applied to a variety of other spacecraft, for example remote sensing and exploratory spacecraft, as well as to spacecraft in other orbits or traveling through interplanetary or interstellar space.

Figure 2:
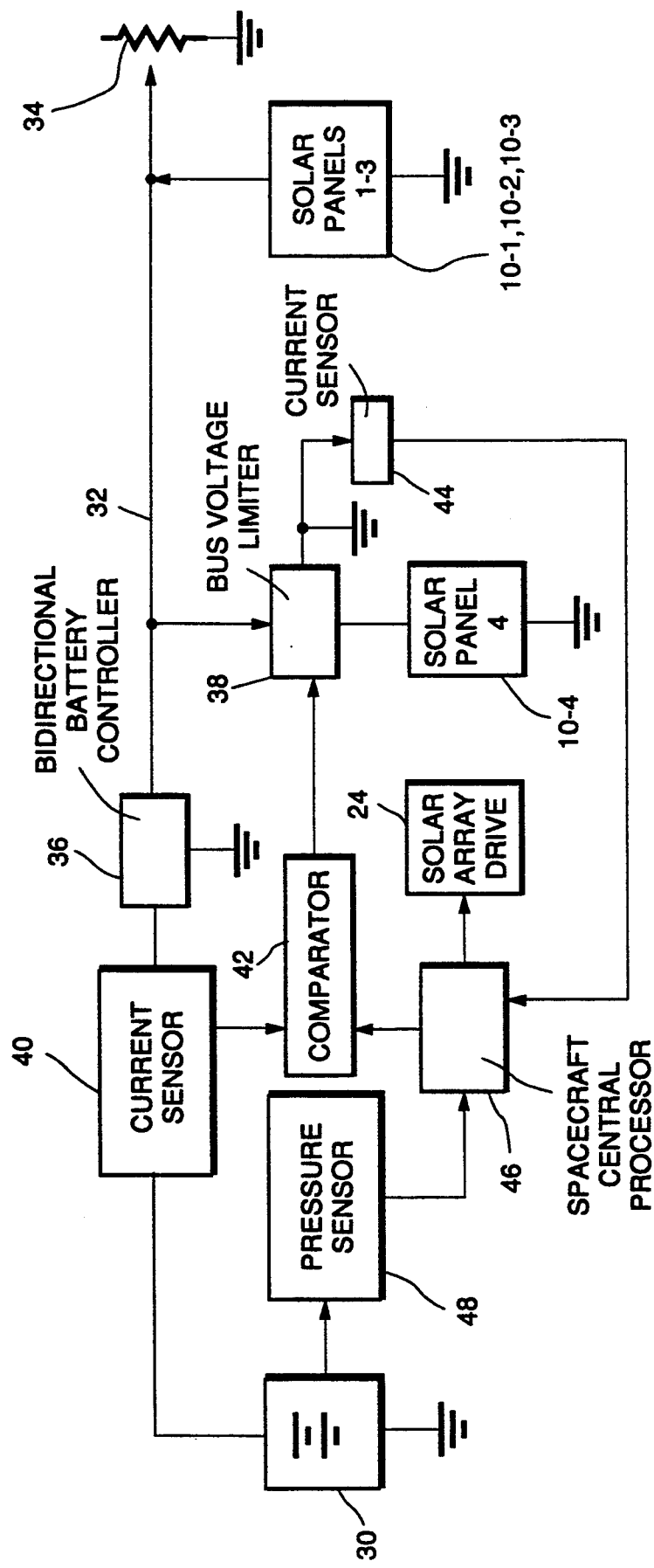
FIG. 2 is a block diagram of a spacecraft bus power regulation apparatus constructed according to the present invention.
Figure 3:
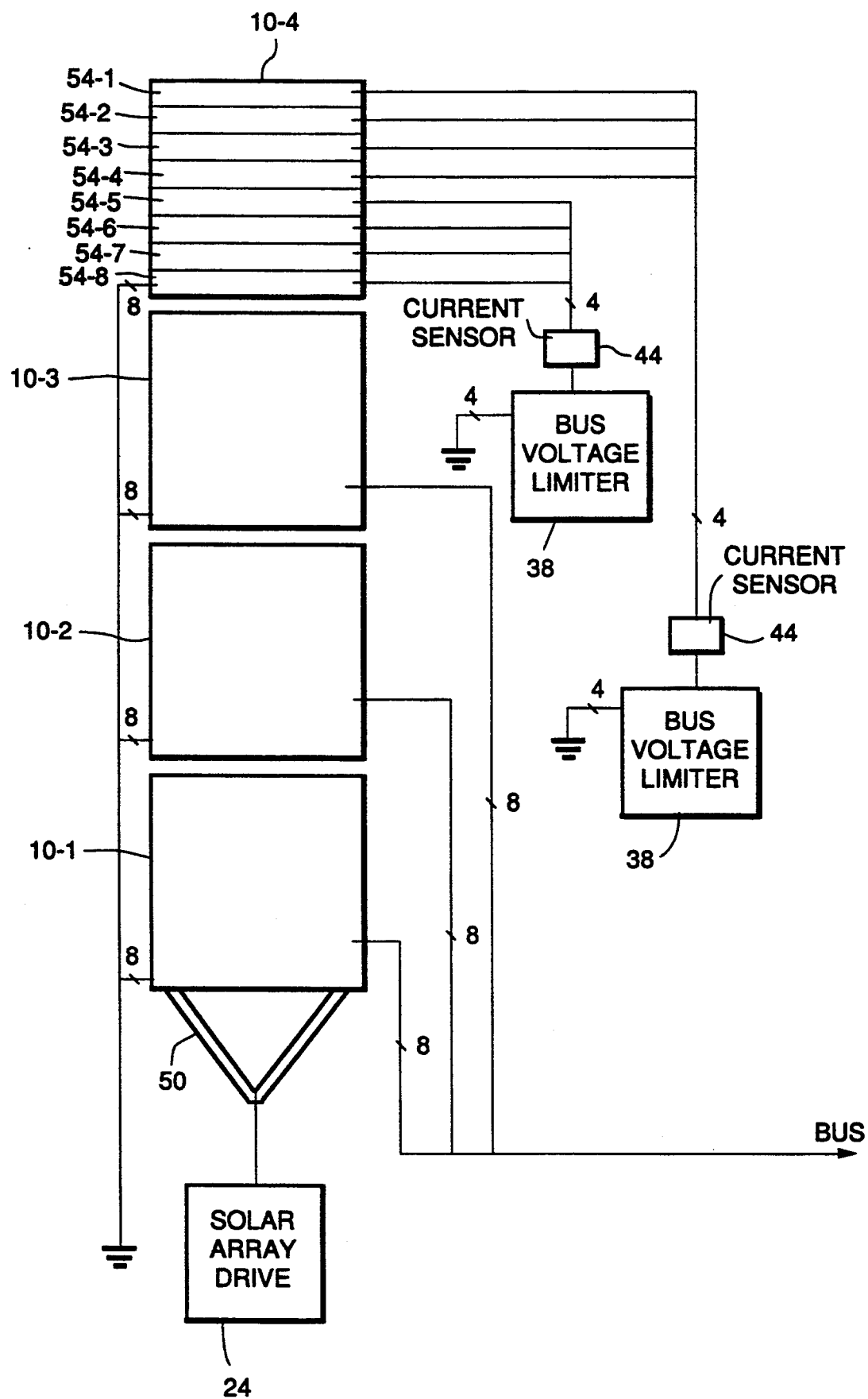
FIG. 3 is a more detailed diagram of the solar panels and bus voltage limiters of FIG. 2.

The power demands of the communications, attitude control and other electrical equipment can vary significantly over time. Similarly, the power supplied by the solar arrays can also vary. Seasons and the shadows of the Earth or other celestial bodies, for example, affect the solar arrays' power generation ability. Accordingly, a satellite typically also includes a battery 30 as shown in FIGS. 2 and 3. The battery supplies power to a spacecraft power bus 32 which supplies power for the power consuming devices on the spacecraft 34, the electrical load. The power bus is indicated for convenience as having a supply side and a return line indicated as a ground. The ground may be an actual wire return line or it may be a connection to a metallic framework of the spacecraft. Each panel 10-1 to 10-4 of the solar array also is connected to the spacecraft bus to supply power to the spacecraft bus. The battery may be a nickel-hydrogen, nickel-cadmium, sodium-sulfur, or any of a variety of other designs as are known in the art. The battery is electrically coupled directly to a bidirectional battery controller 36. The controller can be based on any of a variety of different designs which are known in the art, the purpose of which is to regulate current flow in order to maintain a consistent voltage on the bus. The electrical loads coupled to the bus are preferably designed to work from a consistent voltage, for example, fifty volts. However, the current demands of the loads may vary greatly depending on the mode of operation of the systems. In addition, the power supplied by the solar panels and by the battery can vary as well. Accordingly, in order to maintain a consistent voltage on the bus, the bidirectional battery controller must constantly adjust the flow of current into and out of the battery to maintain a consistent voltage. Preferably, the bidirectional battery controller is designed to react within very small fractions of a second to changes in the supply of power and in spacecraft loads.

In the preferred embodiment, the three inboard solar panels of each array are connected directly to the spacecraft bus, while the fourth and outermost panel is connected through a bus voltage limiter 38. The bus voltage limiter has a switch for each solar cell circuit of the fourth panel which either connects the circuit to the power bus or to ground as is well known in the art. In a typical spacecraft of the type shown in FIG. 1, the solar array is folded during launch and transfer orbit maneuvers in order to protect the solar panels from harm and in order to pack the spacecraft into the small space available in launch vehicles. The outermost panels 10-4 are typically exposed to the sun after the spacecraft separates from the launch vehicle and before the solar panels are extended from their undeployed or folded position to the deployed position shown in FIG. 1. Accordingly, by connecting the bus voltage limiter to the outermost solar panel 10-4 the bus voltage can be controlled both when the solar arrays are deployed and undeployed. The bus voltage limiter has a set of switches which shunt a portion of the power generated by the solar panel to which they are connected to ground reducing the amount of power supplied to the bus. Preferably, the spacecraft is designed so that the solar panels produce more power than is necessary to drive the spacecraft loads in ordinary circumstances. By shunting some of the power of the solar arrays, the bus voltage can be controlled to that which is desired for operation of the spacecraft.

In the embodiment of FIGS. 2 and 3, the spacecraft has a first current sensor 40 which senses the current flow into and out of the battery and, a second current sensor 44 which senses the shunted current flowing from the bus voltage limiter to ground By measuring the shunted current, the sensor effectively monitors the operational status of the bus voltage limiter by determining how much current is switched to ground. The same function can also be achieved by monitoring the output current of the limiter or by monitoring the status of the switches directly. The second current measurement is fed to a data processor on the spacecraft, preferably the spacecraft central processor (SCP) 46, together with measurements made by a battery condition sensor 48. It is presently preferred that the battery be a nickel-hydrogen type and that the battery condition sensor be a pressure sensor measuring the pressure inside each cell of the battery to indicate the battery's state of charge. The first current measurement is fed to a comparator 42.

Using a calendar of available solar radiation and housekeeping information, the SCP determines a desirable state of charge for the battery. It then compares this desired state to the battery's actual state as measured by the pressure sensor 48 to determine whether the battery should be charging or discharging and to what degree. From this determination, the SCP generates a battery current reference signal which is also sent to the comparator 42. The comparator compares the reference signal to the actual battery current as measured by the first current sensor and produces an error signal representative of the difference between the reference and the measured battery current. The error signal is provided to the bus voltage limiter which attempts to bring the error signal to zero by supplying more or less solar panel power to the bus as described in more detail below. A bus voltage limiter typically is designed to maintain the bus voltage at a specific predetermined set point. To this end, a conventional limiter compares the bus voltage to a reference and either adds more or less solar cell power as necessary to maintain the desired voltage. In the present invention, the bus voltage limiter is adapted to maintain battery current at a level determined by the SCP using the comparator 42. It is clear to those skilled in the art how a conventional bus voltage limiter can be modified to respond to the comparator of FIG. 2 instead of to a bus voltage comparison.

In a typical spacecraft, each solar array has four panels 10-1 through 10-4 which are coupled through a yoke 50 (see FIG. 3) to the solar array drive 24. The solar array drive, as described above, rotates the solar array to control the orientation of the solar array with respect to the sun. Each solar panel is divided into a set of independent circuits or strings 54-1 to 54-8 of solar cells. The strings are connected to the bus voltage limiter which preferably is capable of individually shunting each string independently to ground using internal switches. Accordingly, any one or more of the solar cell strings can be isolated from the spacecraft bus to control the power supply to the spacecraft bus. In a conventional spacecraft, each and every one of the solar cell strings on each and every panel can independently be shunted. The bus voltage limiter required to independently shunt each and every one of the solar cell strings to ground must accordingly be rather large and heavy. In the present invention, as shown in FIG. 3, it is preferred that only the strings of the outermost solar panel be coupled to the bus voltage limiter. While this significantly reduces the weight of the bus voltage limiter, it also reduces the amount of control over the power supplied to the bus. According to the present invention, the additional level of control desired in the amount of power supplied to the spacecraft bus is supplied by the solar array drive 24 through the SCP.

The spacecraft central processor is coupled to the solar array drive so that it controls the position of the solar panels. The amount of electricity produced by a photovoltaic solar cell is related to the cosine of the angle of the photovoltaic cell with respect to a line drawn from the surface of the cell to the light source, in this case, typically the sun. As a result, tilting the solar panels away from the sun reduces the effectiveness of the solar cells on that panel. By tilting one or both of the solar arrays away from the sun, the total power output of the solar arrays can be reduced. By the same token, tilting the solar arrays toward the sun increases the area of the solar cells seen by the sun and increases the power available on the spacecraft bus. Because the angle of the solar arrays affects the attitude of the spacecraft and because quick movements of a solar panel can create oscillations or other disturbances to the spacecraft attitude, the solar arrays are preferably moved only very slowly. Solar arrays often are limited to movements no faster than one degree per minute in order to minimize the destabilizing effects of solar array movement. As stated above, in a typical application, the solar cells may be capable of producing approximately one hundred amps for the spacecraft bus and fluctuations in power demands can be on the order of ten amps. If the solar panels were producing an adequate amount of power directly facing the sun and then spacecraft power demands dropped by ten amps, the solar panels would have to be rotated approximately twenty-five degrees away from the sun. This maneuver would take more than twenty-five minutes at a typical maximum solar panel slew rate. However, the bus voltage limiter can compensate for these reductions by shunting a few of the solar array strings within a time on the order of one second. Accordingly, the bus voltage limiter and the bidirectional battery controller compensate for high speed transients in the load substantially autonomously. The solar array drive is used for slower compensations for changes in load conditions. In order to make these fast changes in power supply, it is preferred that the spacecraft maintain a margin of surplus power supply from the solar array. On a typical 100 amp spacecraft bus, transients can change the load by up to seven or eight amps. Accordingly, it is presently preferred that the bus voltage limiter shunt an average of slightly more than seven or eight amps, for example, ten amps to ground. This allows the bus voltage limiter to quickly provide additional needed power when the power demands of the spacecraft increase. It is also preferred that the bus voltage limiter convey a margin of about ten amps to the power bus so that a drop in the power load on the bus can be accommodated just as quickly by shunting some of the circuits. Maintaining a margin of plus or minus ten amps of surplus power allows the bus voltage limiter to compensate for the majority of the changes in spacecraft power load conditions. This also protects the battery from having to make large adjustments in its power supply or recharge rate and may extend battery life. The spacecraft control processor determines the appropriate solar panel angle based upon the input from the second current sensor. It is preferred that the bus voltage limiter shunt approximately half of its available power to ground. When the bus voltage limiter consistently operates near either end of its power supply range, the SCP rotates the solar panels to supply either more or less power as appropriate. Because the spacecraft bus is subject to a many fast transient changes in power needs, the SCP is preferably programmed to more the solar panels only if the bus voltage limiter shunts more than a maximum threshold amount of current or less than a minimum threshold amount of current. This reduces wear on the solar array drives which are too slow to compensate for fast transients anyway.

The operation of the bidirectional battery controller, bus voltage limiter, and solar array drives are all autonomous but each component affects the spacecraft power bus and is in part controlled by it so that the operation of each affects the operation of the others. If the battery state of charge is low, the central processor 46 will instruct the bus voltage limiter to provide more power to the spacecraft bus. This power will be transmitted by the bidirectional battery controller to the battery to charge the battery. Similarly, if the battery state of charge is high, the processor will instruct the battery voltage limiter to shunt more of the solar array power to ground. The control processor can also make changes based on the time of year and orbital position of the spacecraft to ensure that the battery is sufficiently charged in anticipation of eclipse periods, for example.

Figure 4:
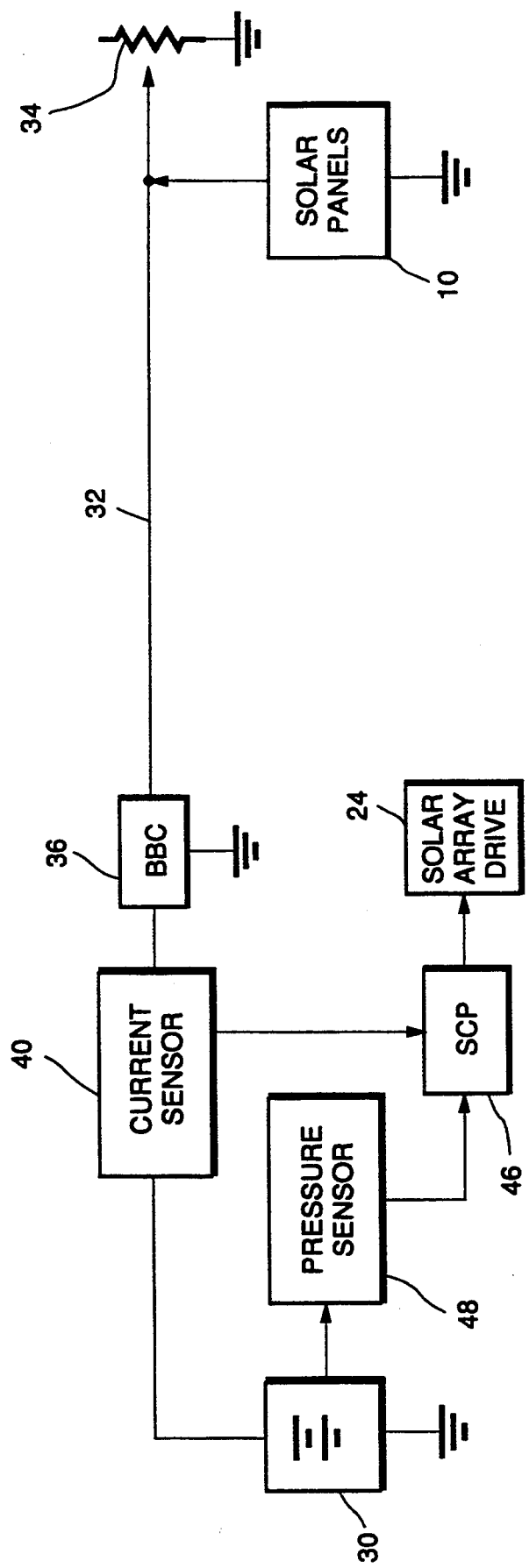
FIG. 4 is a block diagram of a second embodiment of a spacecraft bus power regulation apparatus constructed according to the present invention.

A conventional bus voltage limiter can weigh as much as twenty pounds and one is required for each solar array or wing. Replacing the conventional bus voltage limiters with the smaller bus voltage limiters shown in FIG. 3 can result in a weight reduction of as much as thirty pounds. The solar array drive and SCP are the same units which are used for other purposes and are required regardless of the operation of the power supply system. Further weight savings can be had by eliminating the bus voltage limiter entirely. This is shown, for example, in FIG. 4 using like reference numerals. In FIG. 4, the bidirectional battery controller 36 and the battery 30 are primarily responsible for regulating the voltage and current on the bus 32. The solar array drive 24 is used for adjusting for longer term changes in power demands. The SCP 46 reads the battery state of charge from the pressure sensor 48 and the battery current from the current sensor 40. From this information, the SCP can determine whether more or less power is required to maintain an adequate state of charge on the battery. The solar array is then moved to make any necessary changes. The analysis performed by the SCP in this case is similar to the analysis performed to produce the comparator's error signal in the embodiment of FIG. 2. The analysis is used, however, to control the solar array drives and not a bus voltage limiter. As in the embodiment of FIG. 2, the SCP is preferably programmed to avoid moving the solar arrays in response to fast, transient changes in power bus loads 34. The alternative of FIG. 4 increases the demands on the solar array drives and on the battery and may reduce the battery lifetime, but may be useful in applications where battery lifetime is less important. In both embodiments, the SCP controls the power available to the bus using the solar array drives. This determines the charge rate of the battery, whether directly as in FIG. 4 or indirectly as in FIG. 2 through the bus voltage limiter. The SCP decision loop is controlled by measuring the battery condition and also by measuring the current on the bus. In FIG. 4, bus current is measured indirectly by measuring current flow into or out of the battery. In FIG. 2, bus current is indirectly measured by measuring the shunted current at the bus voltage limiter. The present invention can be adapted to control battery condition more directly and to measure bus current more directly. The disclosed embodiments are preferred because they are believed to offer greater reliability. Any embodiment of the present invention should take attitude control into consideration so that solar array movements designed to regulate spacecraft bus power minimize any disturbances to spacecraft attitude.

While the present invention has been described in terms of only a few embodiments, it will be understood by those skilled in the art that a variety of modifications and adaptations to the described embodiments can be made without departing from the scope of the present invention. The bidirectional battery controller can be fashioned as a separate battery charge controller and battery discharge controller. The processing operations can be performed from a processor other than the SCP or even by a processor at a ground station. The invention can be applied to spacecraft with one or more solar arrays and the bus voltage limiter can be coupled to one or more solar panels or portions of solar panels or portions of multiple solar panels or eliminated altogether. It is not intended by describing only one embodiment to limit the invention to that one embodiment but only by the scope of the following claims.

What is claimed is:

1. In a spacecraft having a bus for carrying electrical power, an apparatus for controlling the electrical power carried on the bus comprising:
   a battery for receiving and storing the electrical power from the bus and for supplying the electrical power from storage to the bus;
   a battery controller for regulating the flow of the electrical power from and to the bus into and out of the battery;
   a solar array having a plurality of solar cells for receiving radiation from the sun, generating electrical power therefrom and supplying the generated electrical power to the bus, the rate of the electrical power generation being affected by the orientation of the solar array with respect to the sun;
   a solar array drive for changing the orientation of the solar array with respect to the sun;
   a battery condition sensor for measuring the charge state of the battery; and
   a processor in communication with the battery condition sensor for controlling the solar array drive so as to affect the rate of electrical power generation of the solar array and thereby cause the solar array to supply the electrical power sufficient to maintain a desired battery condition.

2. Apparatus of claim 1 wherein the battery condition sensor comprises a pressure sensor.

3. Apparatus of claim 1 further comprising a battery current sensor in communication with the processor for measuring current into and out of the battery and wherein the processor controls the operation of the solar array drive in response to the measured current.

4. Apparatus of claim 1 further comprising a bus voltage limiter for regulating the electrical power supplied to the bus by the solar array.

5. Apparatus of claim 4 wherein the solar array solar cells are comprised of strings of solar cells and wherein the bus voltage limiter comprises a plurality of switches, each switch being electrically coupled between a solar cell string and the bus, the bus voltage limiter alternately closing and opening the switches for alternately connecting and disconnecting the respective strings to and from the bus.

6. Apparatus of claim 5 wherein at least some of the solar cell strings are not electrically coupled to any one of the plurality of bus voltage limiter switches.

7. Apparatus of claim 6 wherein the solar array comprises a plurality of panels, each panel having a plurality of solar cell strings and wherein all of the solar cell strings of at least some of the panels are not electrically coupled to any of the switches of the bus voltage limiter.

8. Apparatus of claim 7 wherein the solar array has a deployed position and an undeployed position, at least one of the panels being exposed to solar radiation in the undeployed position and wherein only the solar cell strings of the panel which is exposed to the solar radiation in the undeployed position are electrically coupled to any one of the plurality of bus voltage limiter switches.

9. Apparatus of claim 5 wherein the switches alternately individually connect the solar cell strings either to the spacecraft bus or to a bus return line.

10. Apparatus of claim 4 wherein the processor generates a battery current reference signal in response to the measurement made by the battery condition sensor, the apparatus further comprising:
    a battery current sensor for measuring current into and out of the battery; and
    a comparator for comparing the current measured by the battery current sensor with the current reference signal and generating a current error signal in response thereto and wherein the bus voltage limiter regulates the electrical power supplied to the bus based on the current error signal.

11. Apparatus of claim 4 wherein the limiter regulates the power supplied to the bus by diverting some of the power supplied by the solar array away from the bus, the apparatus further comprising a limiter status sensor, in communication with the processor, for monitoring the power diverted away from the bus by the bus voltage limiter, and wherein the processor controls the solar array drive in response to the limiter status sensor in order to maintain the power diverted by the bus voltage limiter above a determined threshold.

12. In a spacecraft having an electrical power bus, a battery for receiving and storing the electrical power from the bus and providing the electrical power from storage to the bus, a battery controller for regulating the flow of the electrical power from and to the bus into and out of the battery, a solar array for receiving radiation from the sun, generating electrical power therefrom and supplying the generated electrical power to the bus, the rate of electrical power generation being affected by the orientation of the solar array with respect to the sun, and a solar array drive for changing the orientation of the solar array with respect to the sun, an apparatus for controlling the electrical power carried on the bus comprising:
- a battery condition sensor for measuring the charge state of the battery; and
- a processor in communication with the battery condition sensor for controlling the solar array drive so as to affect the rate of electrical power generation of the solar array and thereby cause the solar array to supply the electrical power sufficient to maintain a desired battery condition.

13. Apparatus of claim 12 further comprising a battery current sensor in communication with the processor for measuring current into and out of the battery and wherein the processor controls the operation of the solar array drive in response to the measured current.

14. Apparatus of claim 12 further comprising a bus voltage limiter for regulating the electrical power supplied to the bus by the solar array.

15. Apparatus of claim 14 wherein the solar array comprises solar cells, said solar cells being comprised of a plurality of solar cell strings and wherein the bus voltage limiter comprises a plurality of switches, each switch being electrically coupled between one of the solar cell strings and the bus, the bus voltage limiter alternately closing and opening the switches for alternately connecting and disconnecting respective solar cell strings to and from the bus.

16. Apparatus of claim 15 wherein at least some of the solar cell strings are not electrically coupled to any one of the plurality of bus voltage limiter switches.

17. Apparatus of claim 14 wherein the processor generates a battery current reference signal in response to the measurement made by the battery condition sensor, the apparatus further comprising
- a battery current sensor for measuring current into and out of the battery; and
- a comparator for comparing the current measured by the battery current sensor with the current reference signal and generating a current error signal in response thereto and wherein the bus voltage limiter regulates the electrical power supplied to the bus based on the current error signal.

18. Apparatus of claim 14 wherein the limiter regulates the power supplied to the bus by diverting some of the power supplied by the solar array away from the bus, the apparatus further comprising a limiter status sensor, in communication with the processor, for monitoring the power diverted away from the bus by the bus voltage limiter, and wherein the processor controls the solar array drive in response to the limiter status sensor in order to maintain the amount of power diverted by the bus voltage limiter above a determined threshold.

19. In a spacecraft having a bus for carrying electrical power, a battery coupled to the bus for receiving the electrical power from and storing the electrical power from the bus and for supplying the electrical power to the bus, and a solar array for supplying the electrical power to the bus, a method for controlling the electrical power carried on the bus comprising:
- regulating the flow of the electrical power on the bus into and out of the battery for stabilizing the bus voltage;
- measuring the condition of the battery;
- moving the orientation of the solar array with respect to the sun in response to the battery condition measurement for adjusting the amount of the electrical power generated by the solar array and thereby maintaining a desired battery condition.

20. Method of claim 19 further comprising measuring current on the bus and controlling the orientation of the solar array drive so as to stabilize the bus current.

21. Method of claim 20 wherein the step of measuring the current on the bus comprises measuring current into and out of the battery.

22. Method of claim 19 wherein the solar array comprises a plurality of solar cell strings, the method comprising further regulating the amount of the solar array electrical power supplied to the bus by alternately connecting and disconnecting the solar cell strings to and from the bus.

23. Method of claim 19 further comprising the step of measuring current supplied by the solar array, wherein loads on the bus are variable and wherein the step of moving the orientation of the solar array comprises moving the orientation of the solar array in order to maintain a power surplus on the bus sufficient to support anticipated variations in the loads on the bus.

* * * * *